(12) United States Patent
Goessling et al.

(10) Patent No.: US 9,294,016 B2
(45) Date of Patent: Mar. 22, 2016

(54) CONTROL METHODS AND SYSTEMS FOR MOTORS AND GENERATORS OPERATING IN A STACKED CONFIGURATION

(71) Applicant: Google Inc., Mountain View, CA (US)

(72) Inventors: Andrew David Goessling, Oakland, CA (US); Leo Francis Casey, San Francisco, CA (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 14/133,838

(22) Filed: Dec. 19, 2013

(65) Prior Publication Data

US 2015/0180379 A1    Jun. 25, 2015

(51) Int. Cl.
| | | |
|---|---|---|
| *H02P 5/74* | (2006.01) | |
| *B60L 7/12* | (2006.01) | |
| *H02P 5/00* | (2006.01) | |
| *F03D 9/00* | (2006.01) | |
| *H02P 5/685* | (2006.01) | |
| *F03D 5/00* | (2006.01) | |

(52) U.S. Cl.
CPC .. *H02P 5/00* (2013.01); *F03D 5/00* (2013.01); *F03D 9/002* (2013.01); *H02P 5/685* (2013.01)

(58) Field of Classification Search
None
See application file for complete search history.

(56) References Cited

U.S. PATENT DOCUMENTS

| | | | |
|---|---|---|---|
| 4,288,727 A | 9/1981 | Whitford | |
| 4,718,833 A * | 1/1988 | Berger | 417/16 |
| 6,479,957 B1 | 11/2002 | Erdman et al. | |
| 8,081,019 B2 * | 12/2011 | Jungreis | 327/122 |
| 2002/0084757 A1 * | 7/2002 | Ewbank et al. | B62D 5/003 318/34 |
| 2002/0113167 A1 | 8/2002 | Albero et al. | |
| 2004/0027105 A1 | 2/2004 | Nakamura et al. | |
| 2009/0167231 A1 | 7/2009 | Sussmeier et al. | |
| 2010/0283253 A1 * | 11/2010 | Bevirt | 290/55 |
| 2011/0031344 A1 | 2/2011 | Grenier | |
| 2013/0155735 A1 | 6/2013 | Ilic et al. | |
| 2013/0233964 A1 * | 9/2013 | Woodworth et al. | 244/2 |

FOREIGN PATENT DOCUMENTS

| | | |
|---|---|---|
| JP | 5299519 | 9/2013 |
| WO | 2012118797 | 9/2012 |

OTHER PUBLICATIONS

International Searching Authority, International Search Report and Written Opinion for PCT/US2014/070542 mailed Mar. 31, 2015, 9 pages.

* cited by examiner

*Primary Examiner* — Eduardo Colon Santana
*Assistant Examiner* — Cortez Cook
(74) *Attorney, Agent, or Firm* — McDonnell Boehnen Hulbert & Berghoff LLP

(57) ABSTRACT

While motors or generators stacked in series may allow for higher operating voltages, such motors or generators may also exhibit instability. To minimize instability, the motors or generators may be controlled to have an approximately equal current. An example motor system may include motor stacks connected in series, each motor stack exhibiting a respective stack voltage and a respective differential power (based on a difference in power between motors in the motor stack). A control system may average the stack voltages to generate an average stack voltage and generate a nominal stack power corresponding to each stack voltage. The control system may receive the differential powers, combine each differential power and nominal stack power for the respective motor stack to generate first and a second motor powers, and control each motor stack using the first and second motor powers.

22 Claims, 5 Drawing Sheets

CONTROL METHODS AND SYSTEMS FOR MOTORS AND GENERATORS OPERATING IN A STACKED CONFIGURATION

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

A wind energy system may take the form of an aerial wind turbine (AWT) system. AWT systems may extract useful power from the wind for various purposes such as, for example, generating electricity, lifting or towing objects or vehicles, etc.

In an AWT system, it may be desirable to achieve a high operating voltage so as to, for example, reduce ohmic losses in the AWT system. While the operating voltage of a single motor or generator in such an application may be limited by practical electronics, a higher operating voltage may be achieved by stacking motors or generators in series.

However, motors or generators stacked in series may exhibit instability. In particular, when the motors (or generators) stacked in series are controlled to have approximately equal powers, if currents running through each of the motors (or generators) are not approximately equal, the voltages of the motors (or generators) may diverge, such that the motors (or generators) exhibit voltage instability. Disclosed are methods and systems for controlling motors or generators that are stacked in series in an AWT. Beneficially, some examples described herein may allow for high operating voltages without the risk of instability.

In one aspect, a system is disclosed that includes a motor system and a control system. The motor system may include a number of motor stacks connected in series, each of which includes a first motor and a second motor. The motor system may exhibit a number of stack voltages, each stack voltage corresponding to a respective motor stack. Further, the motor system may exhibit a number of differential powers, each differential power corresponding to a respective motor stack. Each differential power may be given by one half of a power difference between the first motor and the second motor in the respective motor stack. The control system may include an averager, a first circuit, and a second circuit. The averager may be configured to receive the stack voltages and to average the stack voltages to generate an average stack voltage. The first circuit may be configured to receive the average stack voltage and to generate, based on the average stack voltage, a nominal stack power corresponding to each stack voltage. The second circuit may be configured to receive the differential powers and, for each differential power, to combine the differential power and the nominal stack power generated for the respective motor stack to generate both a first motor power and a second motor power. For each motor stack, the control system may be configured to control the first motor based on the first motor power and to control the second motor based on the second motor power.

In another aspect, a method is provided. The method may include receiving a set of stack voltages from a motor system that includes a number of motor stacks connected in series. Each motor stack may include a first motor and a second motor, where each stack voltage corresponds to a respective motor stack. The method may further include averaging the stack voltages to generate an average stack voltage, and generating a nominal stack power corresponding to each stack voltage, where each nominal stack power is based on at least the average stack voltage. The method may further include receiving a set of differential powers, each of which corresponds to a respective motor stack in the number of motor stacks. Each differential power may be given by one half of a power difference between the first motor and the second motor in the respective motor stack. The method may still further include, for each differential power, combining the differential power and the nominal stack power generated for the respective motor stack to generate both a first motor power and a second motor power and, for each motor stack, controlling the first motor based on the first motor power and controlling the second motor based on the second motor power.

In a further aspect a non-transitory computer readable medium is provided having stored therein instructions executable by a computing device to cause the computing device to perform functions including receiving a set of stack voltages from a motor system that includes a number of motor stacks connected in series. Each motor stack may include a first motor and a second motor, where each stack voltage corresponds to a respective motor stack. The functions may further include averaging the stack voltages to generate an average stack voltage, and generating a nominal stack power corresponding to each stack voltage, where each nominal stack power is based on at least the average stack voltage. The functions may further include receiving a set of differential powers, each of which corresponds to a respective motor stack in the number of motor stacks. Each differential power may be given by a power difference between the first motor and the second motor in the respective motor stack. The functions may still further include, for each differential power, combining the differential power and the nominal stack power generated for the respective motor stack to generate both a first motor power and a second motor power and, for each motor stack, controlling the first motor based on the first motor power and controlling the second motor based on the second motor power.

In yet another aspect, a system is disclosed that includes means for receiving a set of stack voltages from a motor system that includes a number of motor stacks connected in series. Each motor stack may include a first motor and a second motor, where each stack voltage corresponds to a respective motor stack. The system may further include means for averaging the stack voltages to generate an average stack voltage, and means for generating a nominal stack power corresponding to each stack voltage, where each nominal stack power is based on at least the average stack voltage. The system may further include means for receiving a set of differential powers, each of which corresponds to a respective motor stack in the number of motor stacks. Each differential power may be given by a power difference between the first motor and the second motor in the respective motor stack. The system may still further include means for combining each differential power with the nominal stack power generated for the respective motor stack to generate both a first motor power and a second motor power and, for each motor stack, and means for controlling the first motor based on the first motor power and controlling the second motor based on the second motor power.

These as well as other aspects, advantages, and alternatives, will become apparent to those of ordinary skill in the art

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. Overview

Example embodiments relate to a motor system and a control system, which may be used in a wind energy system, such as an aerial wind turbine (AWT) system. In particular, example embodiments may relate to or take the form of methods and systems for controlling motors or generators stacked in series in the AWT system.

By way of background, an AWT may include an aerial vehicle that flies in a path, such as a substantially circular path, to convert kinetic wind energy to electrical energy. In an example embodiment, the aerial vehicle may be connected to a ground station via a tether. While tethered, the aerial vehicle may: (i) fly at a range of elevations and substantially along the path, and return to the ground, and (ii) transmit electrical energy to the ground station via the tether. (In some embodiments, the ground station may transmit electricity to the aerial vehicle for take-off and/or landing.)

In the AWT system, it may be desirable to achieve a high operating voltage so as to minimize ohmic losses in the tether. A desirable operating voltage may not be feasible with a single motor or generator, due to practical limitations of the electronics in the motor or generator. However, a desirable operating voltage may be achieved by stacking the motors or generators in series. In particular, a number of motor stacks (or generator stacks) may be stacked in series. Each motor stack (or generator stack) may include one or more motors (or generators).

While the stacked motors or generators may achieve the desired operating voltage, the stacked motors or generators may be unstable. To stabilize the motors or generators stacked in series, an average current through each motor stack (or generator stack) can be controlled to be approximately equal in each motor or generator. The disclosed methods and systems may help to control the stacked motors or generators such that the current through each motor is substantially the same, thus helping to increase the operating voltage of the AWT system while also helping to avoid dangerous instability.

II. Example Systems

A. Example Airborne Wind Turbine (AWT)

Figure 1:
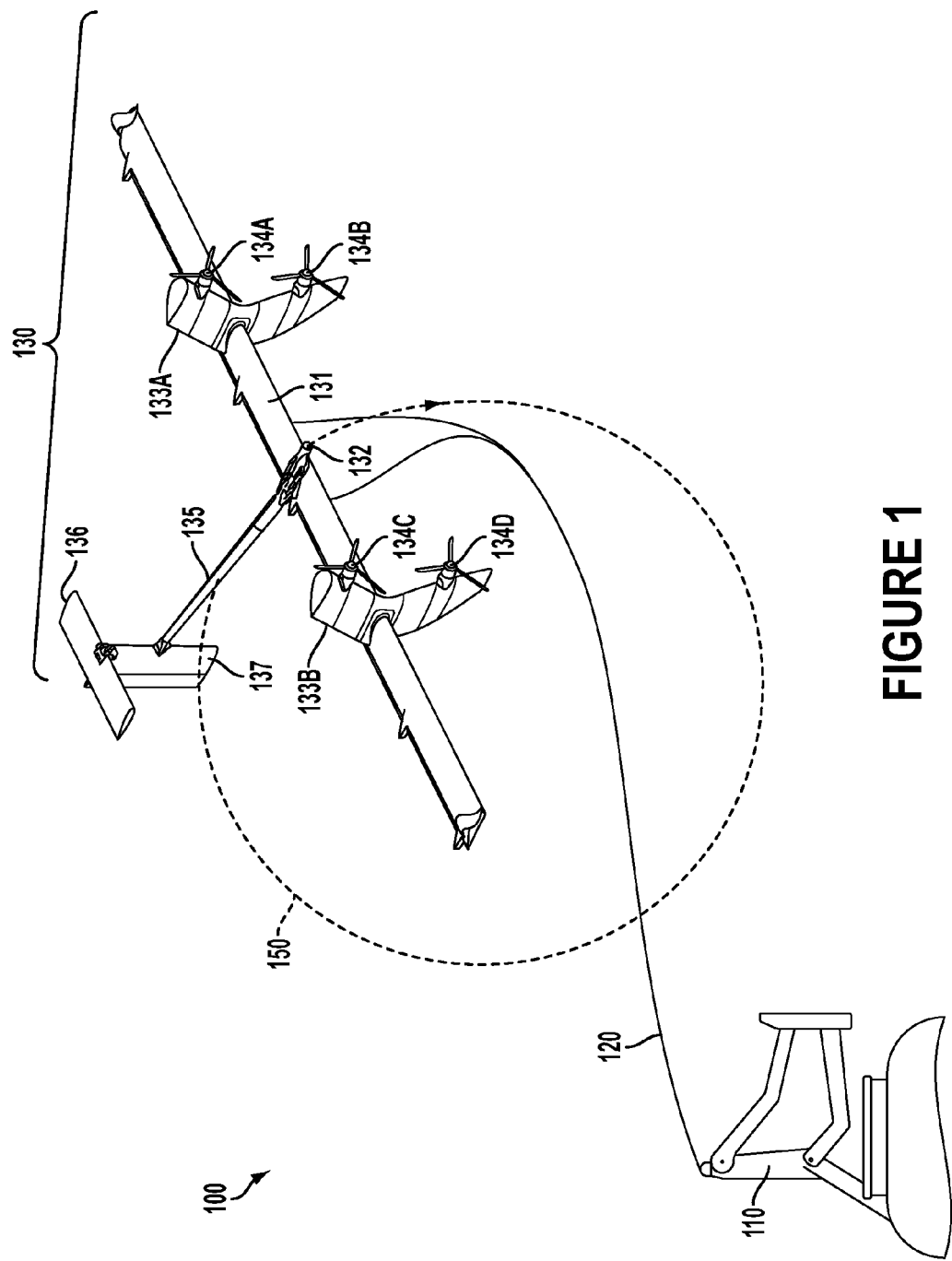
FIG. 1 illustrates an Airborne Wind Turbine (AWT), according to an example embodiment.

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, or crosswind flight.

In addition, the ground station 110 may include one or more components (not shown), such as a winch, that may vary a length of the tether 120. Such components will be described in greater detail later in this disclosure. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be used in the formation of aerial vehicle as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
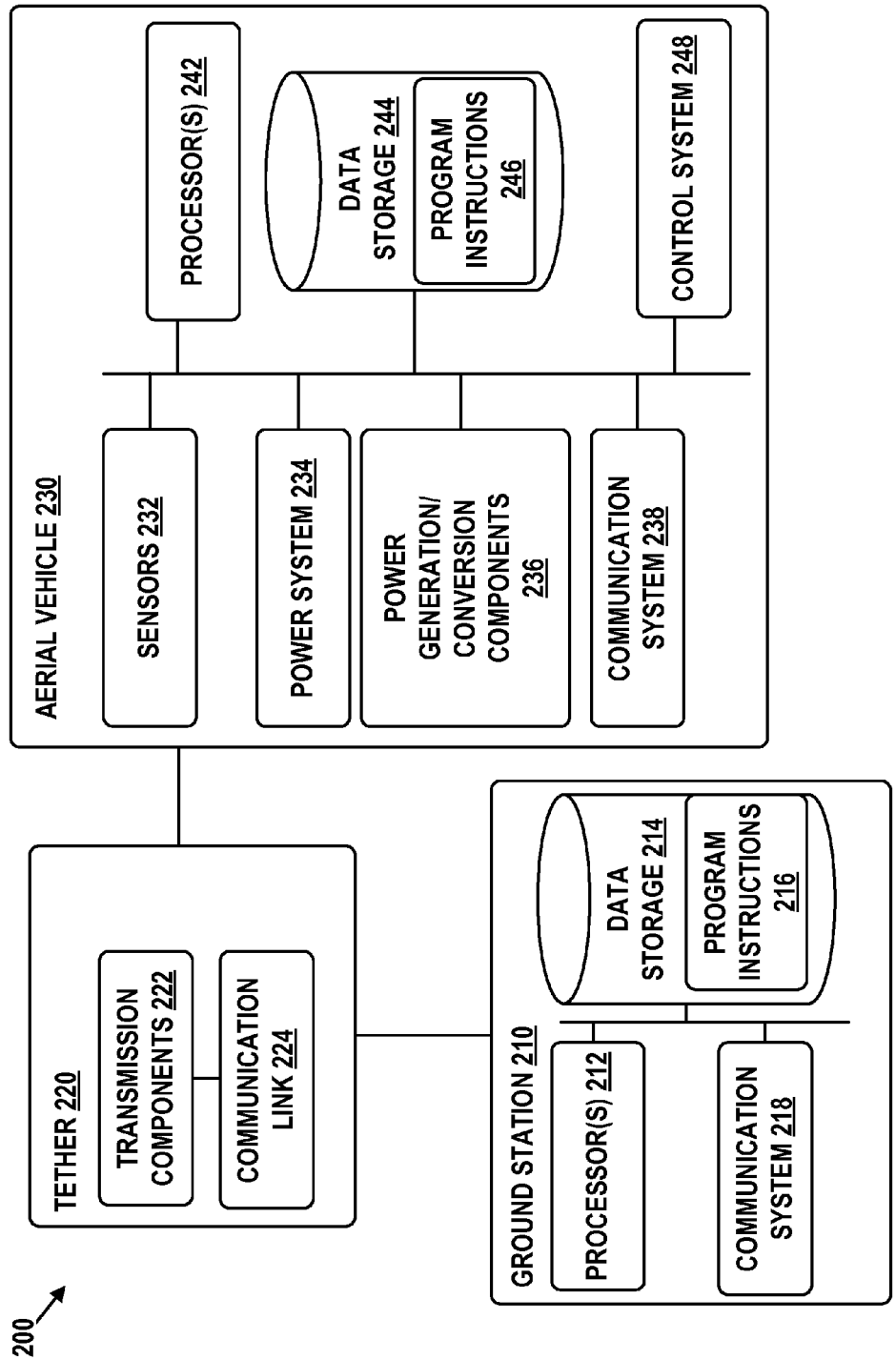
FIG. 2 illustrates a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that may allow for both short-range communication and long-range communication. For example, ground station 210 may be configured for short-range communications using Bluetooth and may be configured for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which may allow for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

C. Example Motor System

Figure 3:
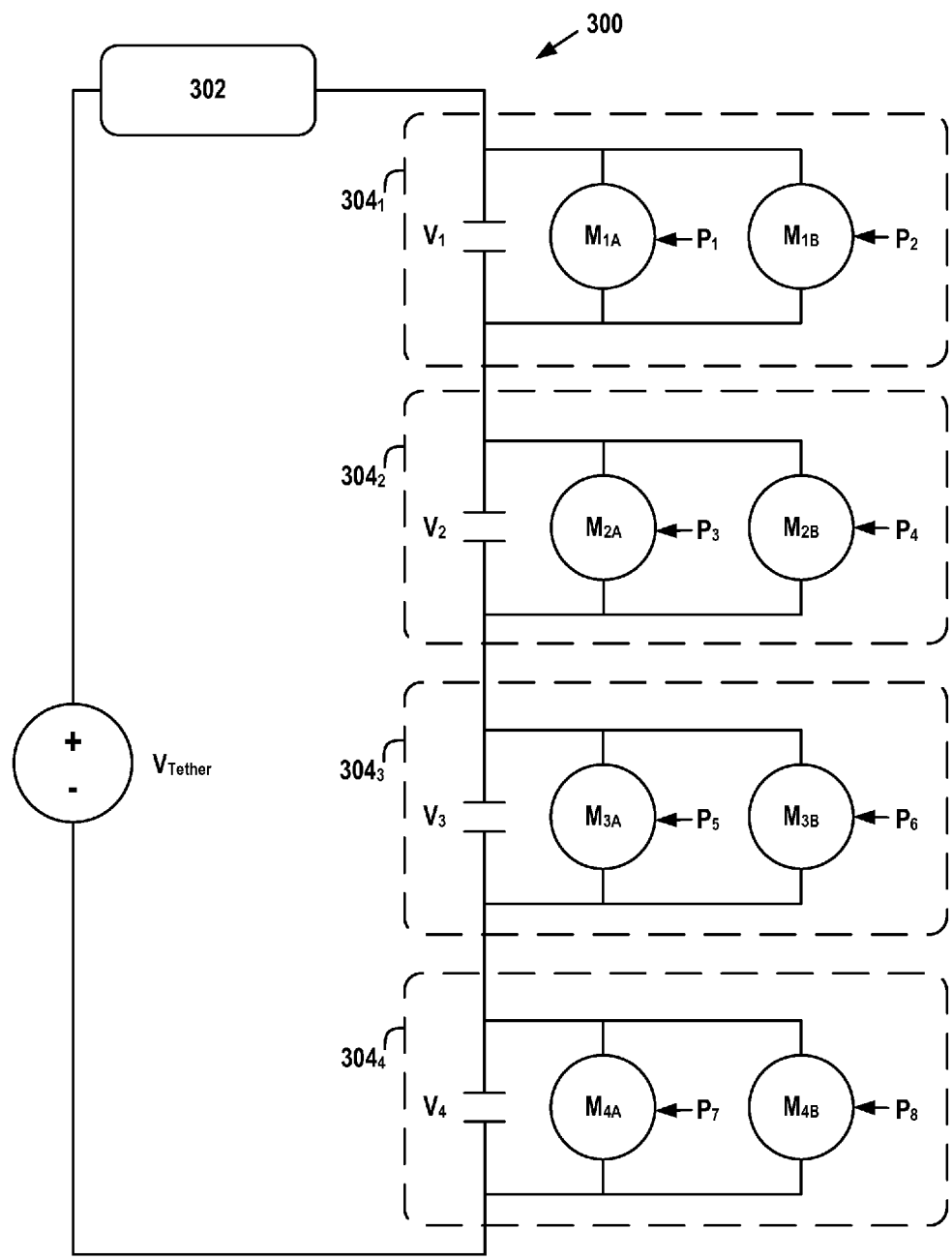
FIG. 3 illustrates a motor system, according to an example embodiment.

FIG. 3 illustrates a motor system 300, according to an example embodiment. The motor system 300 may be designed for use in an aerial vehicle of an AWT, such as the aerial vehicle 130 illustrated in FIG. 1. In particular, the motor system 300 may be integrated with a power system in the aerial vehicle, such as the power system 234 described above in connection with FIG. 2. Alternatively or additionally, the motor system 300 may be designed for use in a ground station of an AWT, such as the ground station 110 illustrated in FIG. 1. In particular, the motor system 300 may be integrated with a power system in the ground station. The power system may be similar to the power system 234 described above in connection with FIG. 2.

As shown, the motor system 300 includes four motor stacks $304_1$ to $304_4$ stacked in series and connected to a tether 302. Each motor stack $304_1$ to $304_4$ includes two motors. For example, as shown, the first motor stack $304_1$ includes a first motor $M_{1A}$ and a second motor $M_{1B}$. Similarly, as shown, the second motor stack $304_2$ includes a first motor $M_{2A}$ and a second motor $M_{2B}$, etc. Each of the motors $M_{1A}$ to $M_{4B}$ included in the motor stacks $304_1$ to $304_4$ may be, for example, light-weight high flux electric motors, such as, for example, induction, permanent magnet synchronous, and permanent magnet brushless machines. Other motors are possible as well.

Each of the motor stacks $304_1$ to $304_4$ exhibits a stack voltage. In particular, as shown, motor stack $304_1$ exhibits stack voltage $V_1$, motor stack $304_2$ exhibits stack voltage $V_2$, motor stack $304_3$ exhibits stack voltage $V_3$, and motor stack $304_4$ exhibits stack voltage $V_4$. As shown, the stack voltage is the voltage across each motor stack.

As noted above, motors stacked in series, as in the motor system 300, may exhibit instability. One possibility for stabilizing the motor system 300 is to control an average current through each motor stack $304_1$ to $304_4$ to be approximately equal. To this end, the stack voltages $V_1$ to $V_4$ may be controlled to be approximately equal. In an example embodiment, the stack voltages $V_1$ to $V_4$ may be controlled by a control system in an effort to equalize the stack voltages.

D. Example Control System

Figure 4:
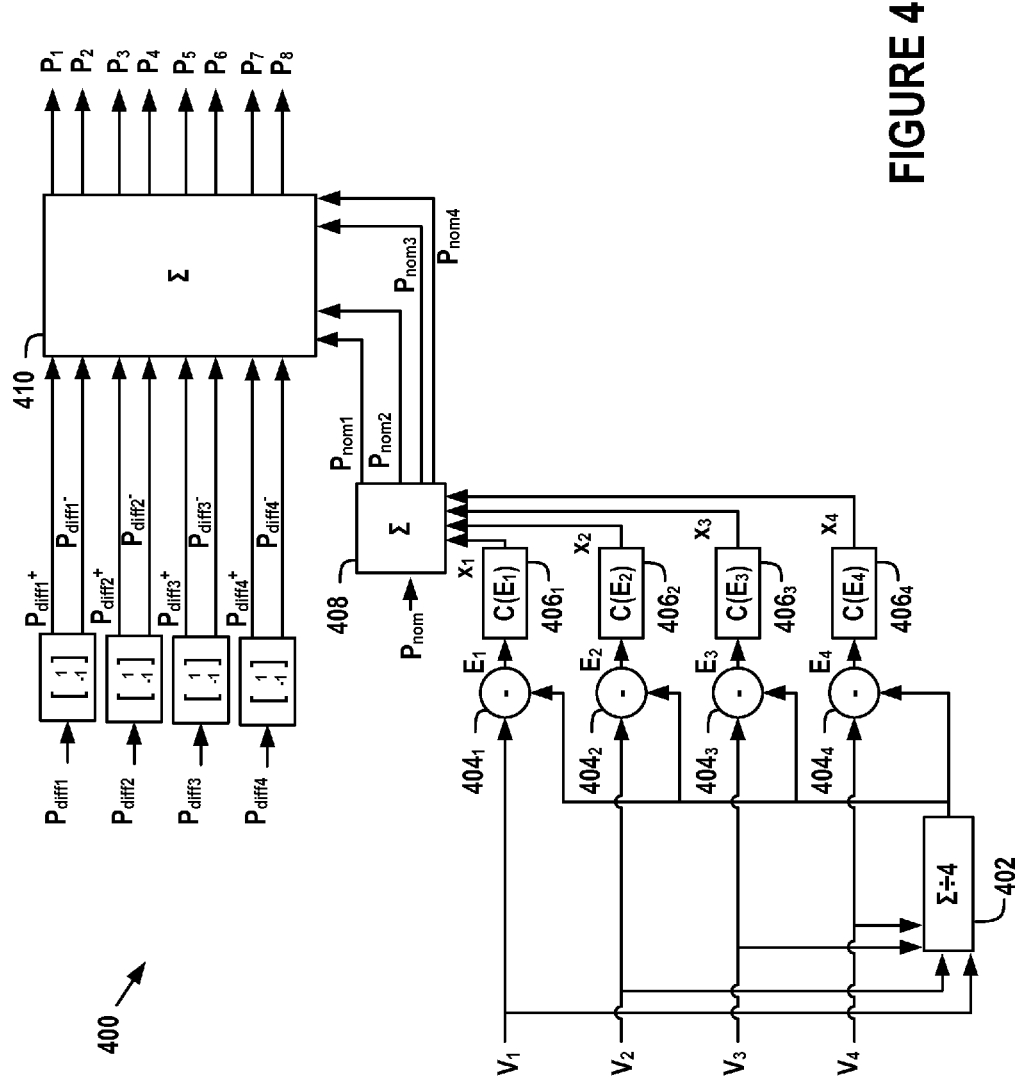
FIG. 4 illustrates a control system, according to an example embodiment.

FIG. 4 illustrates a control system 400, according to an example embodiment. In embodiments where a motor system is included in the aerial vehicle, the control system 400 may similarly be included in the aerial vehicle. For example, the control system 400 may be similar to the control system 248 described above in connection with FIG. 2. Alternatively or additionally, in embodiments where a motor system is included in the ground station, the control system 400 may be included in the ground station. The control system 400 may still be similar to the control system 248 described above in connection with FIG. 2. Still alternatively or additionally, in embodiments where the motor system is included in aerial vehicle, the control system 400 may be included in the ground station, or vice versa. Still alternatively or additionally, in embodiments where a motor system is included in each of the aerial vehicle and the ground station, the control system 400 may be included in either of the aerial vehicle and ground station.

As shown, the control system 400 includes an averager 402, a set of subtractors 404₁ to 404₄, a set of compensation networks 406₁ to 406₄, a first summer 408, and a second summer 410. The subtractors 404₁ to 404₄, the compensation networks 406₁ to 406₄, and the first summer 408 may be referred to collectively as a first circuit, and the second summer 408 may be referred to as a second circuit. While the control system 400 is shown schematically, it will be understood that the control system 400 may be implemented using any combination of mechanical systems, hardware, firmware, and/or software.

The averager 402 may be configured to receive the stack voltages $V_1$ to $V_4$, as shown. Upon receiving the stack voltages $V_1$ to $V_4$, the averager 402 may generate an average stack voltage from the stack voltages $V_1$ to $V_4$. In particular, to average the stack voltages $V_1$ to $V_4$, the averager 402 may sum the stack voltages $V_1$ to $V_4$ and then divide the sum by four, as shown in FIG. 4. The averager 402 may then provide the average stack voltage to the subtractors 404₁ to 404₄.

Each subtractor 404₁ to 404₄ may receive the average stack voltage. Further, each subtractor 404₁ to 404₄ may receive a respective stack voltage $V_1$ to $V_4$. In particular, as shown, the subtractor 404₁ may receive the stack voltage $V_1$, the subtractor 404₂ may receive the stack voltage $V_2$, the subtractor 404₃ may receive the stack voltage $V_3$, and the subtractor 404₄ may receive the stack voltage $V_4$.

Each subtractor 404₁ to 404₄ may subtract the average stack voltage from its respective stack voltage $V_1$ to $V_4$ to output a respective error term $E_1$ to $E_4$. In particular, as shown, the subtractor 404₁ may subtract the average stack voltage from the stack voltage $V_1$ to output the error term $E_1$, as shown. Further, the subtractor 404₂ may subtract the average stack voltage from the stack voltage $V_2$ to output the error term $E_2$, the subtractor 404₃ may subtract the average stack voltage from the stack voltage $V_3$ to output the error term $E_3$, and the subtractor 404₄ may subtract the average stack voltage from the stack voltage $V_4$ to output the error term $E_4$, as shown. The error terms $E_1$ to $E_4$ may be in volts.

Each subtractor 404₁ to 404₄ may provide its respective error term $E_1$ to $E_4$ to a respective compensation network 406₁ to 406₄. In particular, as shown, the subtractor 404₁ may provide error term $E_1$ to the compensation network 406₁, the subtractor 404₂ may provide error term $E_2$ to the compensation network 406₂, the subtractor 404₃ may provide error term $E_3$ to the compensation network 406₃, and the subtractor 404₄ may provide error term $E_4$ to the compensation network 406₄.

Each compensation network 406₁ to 406₄ may supply its respective error term $E_1$ to $E_4$ to a respective function $C(E_1)$ to $C(E_4)$. In some embodiments, the functions $C(E_1)$ to $C(E_4)$ may be, for example, gain functions, proportional integral derivative control law functions, Laplace functions (e.g., $1/(\tau^5+1)$, non-linear functions, or compensation functions. Other functions are possible as well. Upon supplying its respective error term $E_1$ to $E_4$ to its respective function $C(E_1)$ to $C(E_4)$, each compensation network 406₁ to 406₄ may output a respective positive term $x_1$ to $x_4$ that is based on the respective error term $E_1$ to $E_4$. In particular, as shown, the compensation network 406₁ may supply the error term $E_1$ to the function $C(E_1)$ to output the positive term $x_1$, the compensation network 406₂ may supply the error term $E_2$ to the function $C(E_2)$ to output the positive term $x_2$, the compensation network 406₃ may supply the error term $E_3$ to the function $C(E_3)$ to output the positive term $x_3$, the compensation network 406₄ may supply the error term $E_4$ to the function $C(E_4)$ to output the positive term $x_4$. The positive terms $x_1$ to $x_4$ may be in watts.

Each compensation network 406₁ to 406₄ outputs its respective positive term $x_1$-$x_4$ to the first summer 408, as shown. The first summer 408 also receives a nominal power $P_{nom}$ from the motor system (e.g., the motor system 300). The nominal power $P_{nom}$ may be commanded to the control system 300 by a higher-level controller. The first summer 408 sums each of the positive terms $x_1$ to $x_4$ with the nominal power $P_{nom}$ to output nominal stack powers $P_{nom1}$ to $P_{nom4}$. In particular, the first summer 408 sums the positive term $x_1$ with the nominal power $P_{nom}$ to output the nominal stack power $P_{nom1}$, the first summer 408 sums the positive term $x_2$ with the nominal power $P_{nom}$ to output the nominal stack power $P_{nom2}$, the first summer 408 sums the positive term $x_3$ with the nominal power $P_{nom}$ to output the nominal stack power $P_{nom3}$, and the first summer 408 sums the positive term $x_4$ with the nominal power $P_{nom}$ to output the nominal stack power $P_{nom4}$. The first summer 408 may provide the outputted nominal stack powers $P_{nom1}$ to $P_{nom4}$ to the second summer 410, as shown.

Thus, the first circuit (including the subtractors 404₁ to 404₄, the compensation networks 406₁ to 406₄, and the first summer 408) may be configured to receive the average stack voltage and to generate, based on the average stack voltage, the nominal stack power $P_{nom1}$ to $P_{nom4}$ corresponding to each stack voltage.

The second summer 410 may receive the nominal stack powers $P_{nom1}$ to $P_{nom4}$ from the first summer 408. The second summer may additionally receive differential powers $P_{diff1}$ to $P_{diff4}$ from the motor system (e.g., the motor system 300).

The differential powers $P_{diff1}$ to $P_{diff4}$ may each be based on a power difference between the two motors in a respective motor stack in the motor system. For example, with reference to the motor stacks 304₁ to 304₄ in the motor system 300, differential power $P_{diff1}$ may be given by one half of the power difference between the first motor $M_{1A}$ and the second motor $M_{1B}$ in the first motor stack 304₁, differential power $P_{diff2}$ may be given by one half of the power difference between the first motor $M_{2A}$ and the second motor $M_{2B}$ in the second motor stack 304₂, differential power $P_{diff3}$ may be given by one half of the power difference between the first motor $M_{3A}$ and the second motor $M_{3B}$ in the third motor stack 304₃, and differential power $P_{diff4}$ may be given by one half of the power difference between the first motor $M_{4A}$ and the second motor $M_{4B}$ in the fourth motor stack 304₄.

Each differential power $P_{diff1}$ to $P_{diff4}$ may be used to generate each of a positive differential power $P_{diff1}^+$-$P_{diff4}^+$ and a negative differential power $P_{diff1}^-$-$P_{diff4}^-$, as shown. The positive differential powers $P_{diff1}^+$-$P_{diff4}^+$ and the negative differential powers $P_{diff1}^-$-$P_{diff4}^-$ may be provided to the second summer 410, as shown.

The second summer 410 may sum each nominal stack power $P_{nom1}$ to $P_{nom4}$ with each of a positive differential power $P_{diff1}^+$-$P_{diff4}^+$ and a negative differential power $P_{diff1}^-$-$P_{diff4}^-$ to output motor powers $P_1$ to $P_8$, as shown. In particular, the second summer 410 may sum nominal stack power $P_{nom1}$ with positive differential power $P_{diff1+}$ to output $P_1$, the second summer 410 may sum nominal stack power $P_{nom1}$ with negative differential power $P_{diff1-}$ to output $P_2$, the second summer 410 may sum nominal stack power $P_{nom2}$ with positive differential power $P_{diff2+}$ to output $P_3$, etc.

The motor powers $P_1$ to $P_8$ may be used to control the motor system. For example, with reference to motor system 300, the motors $M_{1A}$ to $M_{4B}$ may be controlled to operate with the motor powers $P_1$ to $P_8$, respectively. When the motors $M_{1A}$ to $M_{4B}$ are controlled to operate with the motor powers $P_1$ to $P_8$, respectively, each motor stack 304₁ to 304₄ may exhibit a combined power approximately equal to twice the nominal power $P_{nom}$. As a result, each motor stack $304_1$ to $304_4$ may exhibit an approximately equal current. By causing the motor stacks $304_1$ to $304_4$ to exhibit an approximately equal current, the control system 400 may stabilize the motor system 300.

The control system 400 thus operates by responding to variations in the stack voltages $V_1$ to $V_4$. In particular, a stack voltage, e.g., $V_1$, that is too high will result in a higher nominal stack power $P_{nom1}$. The higher nominal stack power $P_{nom1}$ will result in higher motor powers $P_1$ and $P_2$ for the motors in the motor stack, which will cause the motor stack to consume more current as compared to the other motor stacks. As a result of current difference among the motor stacks, the stack voltage of the motor stack having the higher nominal stack power $P_{nom1}$ will exhibit a decreased stack voltage, such that the error term for the motor stack is positive. Further, as a result of the current difference among the motor stacks, the stack voltages of the remaining motors stacks will exhibit increased stack voltages, such that the error terms for the remaining motor stacks are negative. In particular, a stack voltage, e.g., $V_1$, that is too high will result in a positive error term $E_1$ and therefore a higher nominal stack power $P_{nom1}$. The higher nominal stack power $P_{nom1}$ will result in higher motor powers $P_1$ and $P_2$ for the motors $M_1$ and $M_2$, respectively, in the motor stack, which will cause the motor stack to consume more current as compared to the other motor stacks. As a result of current difference among the motor stacks, the motor stack having the higher nominal stack power $P_{nom1}$ will exhibit a decreased stack voltage. Further, the remaining motor stacks will exhibit stack voltages $V_2$, $V_3$, $V_4$ that are too low, resulting in negative error terms $E_2$, $E_3$, $E_4$, respectively, and in turn decreased motor powers in the remaining motor stacks. The decreased motor powers will cause the remaining motor stacks to consume less current, causing an increase in their stack voltages. While the foregoing description indicated particular motors and motor stacks, it will be understood that other permutations of motors and motor stacks are possible as well. In this manner, the control system will continually control the stack voltages to be approximately equal.

III. Illustrative Methods

Figure 5:
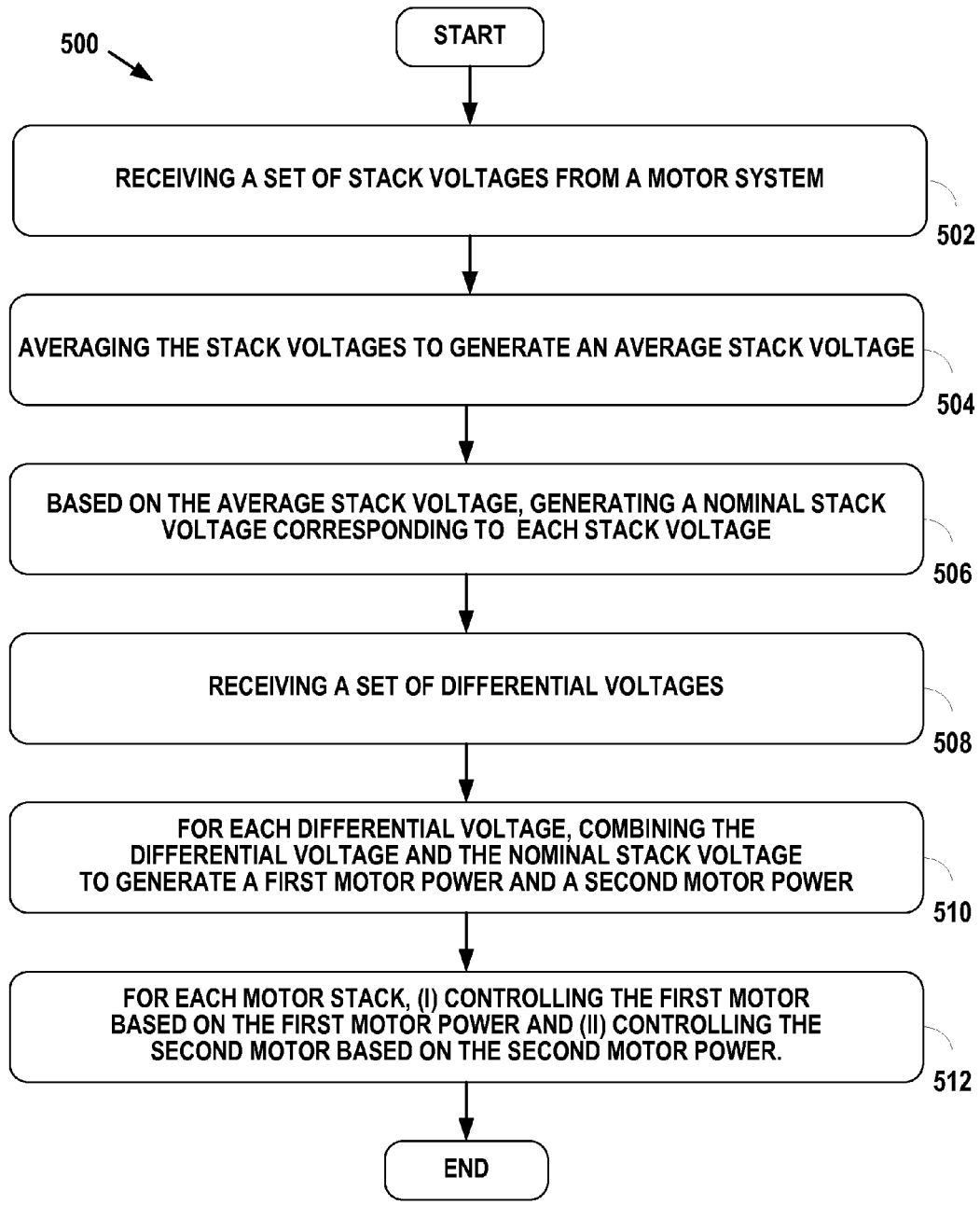
FIG. 5 is a flowchart of a method, according to an example embodiment.

FIG. 5 is a flowchart illustrating a method 500, according to an example embodiment. Method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that store data for short periods of time, including register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 500 and other processes and methods disclosed herein, each block may represent circuitry that is wired to perform the specific logical functions in the process.

The method 500 may be used to maintain stability in a motor system, such as the motor system 300 described above in connection with FIG. 3. To this end, the method 500 may, for example, be carried out by a control system, such as the control system 400 described above in connection with FIG. 4. The motor system and the control system may be formed in whole or in part by a component or components of an aerial vehicle, such as by the one or more components of the aerial vehicle 130 shown in FIG. 1 or the aerial vehicle 230 shown in FIG. 2. Alternatively or additionally, the motor system and the control system may be formed in whole or in part by a component or components of a ground station, such as by the one or more components of the ground station 110 shown in FIG. 1 or the ground station 210 shown in FIG. 2. Other motor systems and control systems are possible as well.

As shown, the method 500 begins at block 502 with the control system receiving a set of stack voltages from a motor system that includes a number of motor stacks connected in series. The motor system may be, for example, similar to the motor system 300 described above in connection with FIG. 3. The motor system may include, for example, four motor stacks. Alternatively, the motor may include more or fewer motor stacks. In any case, each motor stack may include one or more motors, and each stack voltage may correspond to a respective motor stack. In general, for a motor system having N motor stacks and M motors per stack, the control system may be configured to receive N differential powers $P_{diff}$. The control system may multiply each differential power $P_{diff}$ by a vector having a length M (in place of the [1, −1] vector shown in FIG. 4), where the elements of the vector sum to 0. The elements of the vector could, in some embodiments, be modified in real time, so long as the elements continually summed to zero.

The method 500 continues at block 504 with the control system averaging the stack voltages to generate an average stack voltage. To this end, the control system may, for example, sum the stack voltages and divide the sum by the number of motor stacks in the motor system. For example, if the motor system includes four motor stacks (such that four stack voltages are received from the motor system), averaging the stack voltages may involve summing the stack voltages and dividing by four. Other examples are possible as well. To this end, the control system may include an averager, such as the averager 402 described above in connection with FIG. 4.

The method 500 continues at block 506 with the control system generating a nominal stack power corresponding to each stack voltage. Each nominal stack power may be based on the average stack voltage. To this end, to generate each nominal stack power the control system may subtract the average stack voltage from the stack voltage to generate an error term, determine a positive term based on the error term, and sum the positive term with a nominal power for the motor to generate the nominal stack power. In order to determine the positive term, the error term may be fed into a compensation network. The compensation network may generate the positive term based on the error term according to, for example, a compensation function, such as any of the compensation functions described above in connection with FIG. 4.

The method 500 continues at block 508 with the control system receiving a set of differential powers. Each differential power may correspond to a respective motor stack in the number of motor stacks in the motor system. For example, if the motor system includes four motor stacks, the control system may receive four differential powers (one for each motor stack). As noted above, each motor stack may include a first motor and a second motor. Accordingly, for each motor stack, each differential power may be given by one half of a power difference between the first motor and the second motor in the motor stack.

At block 510, the control system may, for each differential power, combine the differential power and the nominal stack power generated for the respective motor stack to generate both a first motor power and a second motor power. In order to generate the first motor power for a differential power for a given motor stack, the control system may generate a positive differential power from the differential power. The positive differential power may be a positive value having the absolute value of the differential power. Then the control system may sum the positive differential power with the nominal stack power generated for the given motor stack to generate the first motor power. Similarly, to generate the second motor power for the differential power, the control system may generate a negative differential power from the differential power. The negative differential power may be a negative value having the absolute value of the differential power. Then the control system may sum the negative differential power with the nominal stack power generated for the given motor stack to generate the second motor power.

Thereafter, at block 512, the control system may control each motor stack. In particular, for each motor stack, the control system may control the first motor to operate with approximately the first motor power. Further, the control system may control the second motor to operate with the second motor power.

The method 500 may be carried out continuously or periodically. By continuously or periodically adjusting the motor powers of the motors in the motor system, the control system may control a current in each of the motor stacks to be approximately equal, thereby stabilizing the motor system.

IV. Alternative Embodiments

The foregoing description focused on stabilizing motor stacks in a motor system based on deviations in the stack voltages of the motor stacks. To this end, the control system described above took the stack voltages as inputs. In other embodiments, instead of taking the stack voltages as inputs, the control system may take stack currents as inputs. Just as each stack voltage was the voltage across a motor stack, each stack current may be the current through a motor stack.

In these embodiments, the control system may take a form similar to that described above in connection with FIG. 4. In particular, the control system may include an averager, a set of subtractors, a set of compensation networks, a first summer, and a second summer. The control system may be implemented using any combination of mechanical systems, hardware, firmware, and/or software.

Instead of taking stack voltages as inputs, though, the control system may take the stack currents as inputs. The averager thus may be configured to receive the stack currents (e.g., $I_1$ to $I_4$) and, upon receiving the stack currents $I_1$ to $I_4$, generate an average stack current from the stack currents. The averager may then provide the average stack current to the subtractors.

Each subtractor may receive the average stack current, as well as one of the stack currents $I_1$ to $I_4$. Each subtractor may subtract the average stack current from its respective stack current $I_1$ to $I_4$ to output a respective error term $E_1$ to $E_4$ and may provide the respective error term $E_1$ to $E_4$ to a respective compensation network. The error terms $E_1$ to $E_4$ may be in amps. Each compensation network may supply its respective error term $E_1$ to $E_4$ to a respective function $C(E_1)$ to $C(E_4)$, each of which may output a respective positive term $x_1$ to $x_4$ that is based on the respective error term $E_1$ to $E_4$. The functions $C(E_1)$ to $C(E_4)$ may take any of the forms described above in connection with FIG. 4. The positive terms $x_1$ to $x_4$ may be in watts.

Each compensation network may output its respective positive term $x_1$-$x_4$ to the first summer. Thereafter, the control system may operate as described above in connection with FIG. 4.

The foregoing description also focused on a motor system. However, the description is similarly applicable to a generator system. Such a generator system may, like the motor system, include a number of generator stacks connected in series. Each generator stack may include one or more generators. Any of the control systems described above may be used to control the generator system to maintain stability, as described above. Further, the description is similarly applicable to a power electronics system. Such a power electronics system may include power electronics stacked in series. The power electronics may serve to, e.g., connect the tether in an AWT system to a power grid. Other applications of the power electronics are possible as well. Any of the control systems described above may be used to control the power electronics to maintain stability, as described above.

V. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:
1. A system comprising:
a motor system comprising a plurality of motor stacks connected in series, wherein each motor stack comprises a first motor and a second motor, wherein the motor system is configured to (i) exhibit a plurality of stack currents, wherein each stack current corresponds to a respective motor stack in the plurality of motor stacks and (ii) exhibit a plurality of differential powers, wherein each differential power corresponds to a respective motor stack in the plurality of motor stacks and wherein each differential power is given by one half of a power difference between the first motor and the second motor in the respective motor stack; and a control system comprising:
(i) an averager configured to average the stack currents to generate an average stack current,
(ii) a first circuit configured to generate, based at least in part on the average stack current, a nominal stack power corresponding to each stack current, and
(iii) a second circuit configured, for each motor stack, to combine the corresponding differential power and the corresponding nominal stack power to generate both: (a) a first motor power corresponding to the first motor in the motor stack and (b) a second motor power corresponding to the second motor in the motor stack;
wherein, for each motor stack, the control system is configured to control the first and the second motors in the motor stack based on the first and second motor powers for the motor stack.

2. The system of claim 1, wherein the first circuit comprises:
a subtractor configured to, for each stack current, subtract the average stack current from the stack current to generate an error term;
a compensation network configured to, for each stack current, determine a positive term based on the error term; and
a summer configured to, for each stack current, sum the positive term with a nominal power for the motor to generate the nominal stack power.

3. The system of claim 2, wherein, for each stack current, the compensation network is configured to determine the positive term according to a gain function that takes the error term as an input.

4. The system of claim 1, wherein the second circuit comprises:
a differential power circuit configured to generate, for each differential power, both a positive differential power and a negative differential power from the differential power; and
a summer configured to, for each differential power:
sum the positive differential power with the nominal stack power generated for the respective motor stack to generate the first motor power, and
sum the negative differential power with the nominal stack power generated for the respective motor stack to generate the second motor power.

5. The system of claim 1, wherein the system comprises an airborne wind turbine system configured to generate electrical energy from wind.

6. The system of claim 5, further comprising:
a ground station;
an aerial vehicle; and
a tether connecting the aerial vehicle to the ground station.

7. The system of claim 6, wherein the aerial vehicle is configured to transmit electrical energy to the ground station via the tether.

8. The system of claim 6, wherein the ground station is configured to transmit electrical energy to the aerial vehicle via the tether.

9. The system of claim 6, wherein the motor system is included in the ground station.

10. The system of claim 6, wherein the motor system is included in the aerial vehicle.

11. A method comprising:
receiving a set of stack currents from a motor system that comprises a plurality of motor stacks connected in series, wherein each motor stack comprises a first motor and a second motor, and wherein each stack current corresponds to a respective motor stack in the plurality of motor stacks;
averaging the stack currents to generate an average stack current;
generating a nominal stack power corresponding to each stack current, wherein each nominal stack power is based at least on the average stack current;
receiving a set of differential powers, wherein each differential power corresponds to a respective motor stack in the plurality of motor stacks and wherein each differential power is given by one half of a power difference between the first motor and the second motor in the respective motor stack;
for each motor stack, combining the corresponding differential power and the corresponding nominal stack power to generate both a first motor power corresponding to the first motor in the motor stack and a second motor power corresponding to the second motor in the motor stack; and
for each motor stack, (i) controlling the first motor based on the first motor power corresponding to the motor stack and (ii) controlling the second motor based on the second motor power corresponding to the motor stack.

12. The method of claim 11, wherein generating the nominal stack power corresponding to each stack current comprises, for each stack current:
subtracting the average stack current from the stack current to generate an error term;
determining a positive term based on the error term; and
summing the positive term with a nominal power for the motor to generate the nominal stack power.

13. The method of claim 12, wherein determining the positive term based on the error term comprises determining the positive term based on a compensation function that takes the error term as an input.

14. The method of claim 13, wherein the compensation function comprises a gain function.

15. The method of claim 11, wherein generating both the first motor power and the second motor power comprises, for each differential power:
generating both a positive differential power and a negative differential power from the differential power;
summing the positive differential power with the nominal stack power generated for the respective motor stack to generate the first motor power; and
summing the negative differential power with the nominal stack power generated for the respective motor stack to generate the second motor power.

16. A non-transitory computer-readable medium having stored therein instructions executable by a computing device to cause the computing device to perform functions comprising:
receiving a set of stack currents from a motor system that comprises a plurality of motor stacks connected in series, wherein each motor stack comprises a first motor and a second motor, and wherein each stack current corresponds to a respective motor stack in the plurality of motor stacks;
averaging the stack currents to generate an average stack current;

generating a nominal stack power corresponding to each stack current, wherein each nominal stack power is based on at least the average stack current;

receiving a set of differential powers, wherein each differential power corresponds to a respective motor stack in the plurality of motor stacks and wherein each differential power is given by one half of a power difference between the first motor and the second motor in the respective motor stack;

for each differential power, combining the differential power and the nominal stack power generated for the respective motor stack to generate both a first motor power and a second motor power; and for each motor stack, (i) controlling the first motor based on the first motor power and (ii) controlling the second motor based on the second motor power.

17. The non-transitory computer-readable medium of claim 16, wherein generating the nominal stack power corresponding to each stack current comprises, for each stack current:

subtracting the average stack current from the stack current to generate an error term;

determining a positive term based on the error term; and summing the positive term with a nominal power for the motor to generate the nominal stack power.

18. The non-transitory computer-readable medium of claim 16, wherein determining the positive term based on the error term comprises determining the positive term based on a compensation function that takes the error term as an input.

19. The non-transitory computer-readable medium of claim 18, wherein the compensation function comprises a gain function.

20. The non-transitory computer-readable medium of claim 16, wherein generating both the first motor power and the second motor power comprises, for each differential power:

generating both a positive differential power and a negative differential power from the differential power;

summing the positive differential power with the nominal stack power generated for the respective motor stack to generate the first motor power; and summing the negative differential power with the nominal stack power generated for the respective motor stack to generate the second motor power.

21. A system comprising:

a generator system comprising a plurality of generator stacks connected in series, wherein each generator stack comprises a first generator and a second generator, wherein the generator system is configured to (i) exhibit a plurality of stack voltages, wherein each stack voltage corresponds to a respective generator stack in the plurality of generator stacks and (ii) exhibit a plurality of differential powers, wherein each differential power corresponds to a respective generator stack in the plurality of generator stacks and wherein each differential power is given by one half of a power difference between the first generator and the second generator in the respective generator stack; and a control system comprising:

(i) an averager configured to average the stack voltages to generate an average stack voltage, (ii) a first circuit configured to generate, based at least in part on the average stack voltage, a nominal stack power corresponding to each stack voltage, and (iii) a second circuit configured, for each generator stack, to combine the corresponding differential power and the corresponding nominal stack power to generate both: (a) a first generator power corresponding to the first generator in the generator stack and (b) a second generator power corresponding to the second generator in the generator stack;

wherein, for each generator stack, the control system is configured to control the first and the second generators in the generator stack based on the first and second generator powers for the generator stack.

22. The system of claim 21, wherein the control system is configured to control the first and the second generators in the generator stack based on the first and second generator powers for the generator stack, such that the generator system exhibits a plurality of currents, wherein each current corresponds to a respective generator stack of the plurality of generator stacks and is approximately equal to the other currents of the plurality of currents so as to stabilize the generator system.

* * * * *